(12) United States Patent
Francis

(10) Patent No.: US 11,270,237 B2
(45) Date of Patent: Mar. 8, 2022

(54) SYSTEM FOR DETERMINING QUANTITATIVE MEASURE OF DYADIC TIES

(71) Applicant: 6Dos, LLC, Addison, TX (US)

(72) Inventor: Ethan Francis, Addison, TX (US)

(73) Assignee: 6DOS, LLC, Addison, TX (US)

( * ) Notice: Subject to any disclaimer, the term of this patent is extended or adjusted under 35 U.S.C. 154(b) by 0 days.

(21) Appl. No.: 16/943,299

(22) Filed: Jul. 30, 2020

(65) Prior Publication Data
US 2021/0042683 A1 Feb. 11, 2021

Related U.S. Application Data

(60) Provisional application No. 62/882,904, filed on Aug. 5, 2019.

(51) Int. Cl.
| | |
|---|---|
| G06F 15/16 | (2006.01) |
| G06Q 10/06 | (2012.01) |
| G06N 20/20 | (2019.01) |
| G06F 16/957 | (2019.01) |
| H04L 67/561 | (2022.01) |
| H04L 67/565 | (2022.01) |
| H04L 67/306 | (2022.01) |

(52) U.S. Cl.
CPC . *G06Q 10/063112* (2013.01); *G06F 16/9574* (2019.01); *G06N 20/20* (2019.01); *H04L 67/2804* (2013.01); *H04L 67/2823* (2013.01); *H04L 67/306* (2013.01)

(58) Field of Classification Search
CPC ....... H04L 63/10; H04L 67/306; H04L 63/08; H04L 67/22; H04L 67/2823; G06F 16/9535
USPC .................... 709/227, 229; 726/4
See application file for complete search history.

(56) References Cited

U.S. PATENT DOCUMENTS

| | | | |
|---|---|---|---|
| 9,195,777 B2 | 11/2015 | Kindler et al. | |
| 10,409,840 B2 | 9/2019 | Onusko | |
| 10,409,873 B2 * | 9/2019 | Mashiach | G06F 16/9535 |
| 2016/0234153 A1 | 8/2016 | Lawler et al. | |
| 2017/0178006 A1 | 6/2017 | Balakrishnan et al. | |

* cited by examiner

*Primary Examiner* — Razu A Miah
*Assistant Examiner* — Andrew Woo
(74) *Attorney, Agent, or Firm* — Michael Best & Friedrich LLP

(57) ABSTRACT

Described are platforms, systems, and methods for determining quantifiable measures of dyadic ties. In one aspect, a method comprises receiving contextual data for a user from at least one data source; processing the contextual data through a first machine-learning model to determine quantifiable measures of dyadic ties between the user and each of a plurality of individuals, the first machine-learning model trained with previously received contextual data of a plurality of other users; determining a grouping for the user based on the determined quantifiable measures, the grouping comprising at least one of the individuals; and providing, through a user-interface, access to the determined quantifiable measures to members of the grouping.

19 Claims, 10 Drawing Sheets

FIG. 3A

SYSTEM FOR DETERMINING
QUANTITATIVE MEASURE OF DYADIC
TIES

CROSS-REFERENCE

This application claims the benefit of U.S. Application No. 62/882,904, filed on Aug. 5, 2019, entitled "SYSTEM FOR DETERMINING QUANTITATIVE MEASURE OF DYADIC TIES," the contents of which are incorporated herein by reference for all purposes.

BACKGROUND

The subject matter of machine learning includes the study of computer modeling of learning processes in their multiple manifestations. In general, learning processes include various aspects such as the acquisition of new declarative knowledge, the devilment of motor and cognitive skills through instruction or practice, the organization of new knowledge into general, effective representations, and the discovery of new facts and theories through observation and experimentations. Implanting such capabilities in computers has been a goal of computer scientist since the inception of the computer era. However, solving this problem has been, and remains, a most challenging goal in artificial intelligence (AI). Unlike human based decision, decision assistance systems embedded with machine learning algorithms are corruption free as thus are reliable. Achieving an understanding of historical data, the identification of trends, seasonal patterns, anomalies, emerging patterns, is time-consuming and prone to errors. Machine learning algorithms efficiently learn rules thus enabling the identification of these signals, and provide accurate predictions on future outcomes.

SUMMARY

Embodiments of the present disclosure are generally directed to a system that determines quantifiable measures of dyadic ties between individuals by processing contextual data through a trained machine-learning model.

In today's increasingly disconnected social media world the described dyadic ties measurement system can be employed to ingest the information available to users of various social media platforms to provide them with a quantifiable score and other characteristics of individuals in their life. Analysis of social networks can be employed as a tool for linking micro and macro levels of sociological theory. This procedure is illustrated by elaboration of the macro implications of one aspect of small-scale interaction: the strength of dyadic ties. In some embodiments, the degree of overlap of two individuals' relationship networks varies directly with the strength of their tie to one another. In some embodiments, the impact of this principle on diffusion of influence and information, mobility opportunity, and community organization quantified by the described system. Stress is laid on the cohesive power of weak ties. Most systems and models deal, implicitly, with strong ties, thus confining their applicability to small, well-defined groups. Emphasis on both strong and weak ties (e.g., the strength of each tie) allows for the described system measure robustly and accurately the relations between individuals.

Social networking involves internet sites and application where relationships exist. Examples of such sites include: Facebook™, LinkedIn™, Instagram™, Twitter™, Reddit™, Youtube™, Meetup™, Pinterest™, Weibo™, Qzone™, and so forth. However, no platform or system is designed to aggregate data from these disparate sites and provide a measure of the relationship between people (e.g., the dyadic ties between individuals) for the individual users of these sites and applications. Moreover, there is no platform or system looking across the digital footprint of an individual, ingesting the various data points in order to build a quantifiable measure of who they know and trust. With the data lying in multiple companies who are often competitors aggregating the data is a difficult task. The described system, however, ingested and measures these relationships across the digital and real-world landscape and provides users feedback based on these measures to assist in determining who knows who and how well.

Accordingly, in a general embodiment, disclosed herein are dyadic ties measurement systems comprising: a user-interface; one or more processors; and a computer-readable storage device coupled to the one or more processors and having instructions stored thereon which, when executed by the one or more processors, cause the one or more processors to perform operations. These operations include: receiving contextual data for a user from at least one data source; processing the contextual data through a first machine-learning model to determine quantifiable measures of dyadic ties between the user and each of a plurality of individuals, the first machine-learning model trained with previously received contextual data of a plurality of other users; determining a grouping for the user based on the determined quantifiable measures, the grouping comprising at least one of the individuals; and providing, through the user-interface, access to the determined quantifiable measures to members of the grouping.

In another general embodiment, one or more non-transitory computer-readable storage media are coupled to one or more processors. The one or more non-transitory computer-readable storage media having instructions stored thereon which, when executed by the one or more processors, cause the one or more processors to perform operations. These operations include: receiving contextual data for a user from at least one data source; processing the contextual data through a first machine-learning model to determine quantifiable measures of dyadic ties between the user and each of a plurality of individuals, the first machine-learning model trained with previously received contextual data of a plurality of other users; determining a grouping for the user based on the determined quantifiable measures, the grouping comprising at least one of the individuals; and providing, through a user-interface, access to the determined quantifiable measures to members of the grouping.

In yet another general embodiment, methods for determining quantifiable measures of dyadic ties are executed by one or more processors. The methods include: receiving contextual data for a user from at least one data source; processing the contextual data through a first machine-learning model to determine quantifiable measures of dyadic ties between the user and each of a plurality of individuals, the first machine-learning model trained with previously received contextual data of a plurality of other users; determining a grouping for the user based on the determined quantifiable measures, the grouping comprising at least one of the individuals; and providing, through a user-interface, access to the determined quantifiable measures to members of the grouping.

An aspect combinable with the general embodiments, the first machine-learning model is retrained with the determined quantifiable measures.

In an aspect combinable with any of the previous aspects, the quantifiable measures of dyadic ties are determined based on user contact detail quality, a frequency of communication, information within communications, information capacity and bandwidth, physical distance, social network ties, or timeliness of when contact information was updated.

In an aspect combinable with any of the previous aspects, the quantifiable measures of dyadic ties are determined based on user contact detail quality, a frequency of communication, information within communications, information capacity and bandwidth, physical distance, social network ties, or timeliness of when contact information was updated.

In an aspect combinable with any of the previous aspects, the first machine-learning model determines the quantifiable measures based on a compounding impact of individual elements from the contextual data.

In an aspect combinable with any of the previous aspects, the first machine-learning model classifies relationships between the user and each of the individuals according to type, length, and age of the respective parties at a time when the respective relationship began.

In an aspect combinable with any of the previous aspects, the first machine-learning model comprises weighted values for the classifications.

In an aspect combinable with any of the previous aspects, the operations include: before processing the contextual data through the first machine-learning model: receiving validation data for the user from at least one data enricher; and processing the contextual data and the validation data through a second machine-learning model to determine contact information for the user and the individuals, the second machine-learning model trained with previously received validation data and the previously received contextual data of the other users.

In an aspect combinable with any of the previous aspects, the received validation data and the determined contact information is processed through the first machine-learning model to determine the quantifiable measures.

In an aspect combinable with any of the previous aspects, the second machine-learning model merges the processed data to determine and verify current and previous contact information for the user and the individuals.

In an aspect combinable with any of the previous aspects, the second machine-learning model merges the processed data to determine a chorological order of the contact information.

In an aspect combinable with any of the previous aspects, the operations include: receiving, from the user-interface, corrections for the determined contact information.

In an aspect combinable with any of the previous aspects, the first machine-learning model is retrained with the corrections.

In an aspect combinable with any of the previous aspects, the operations include: receiving, from the user-interface, instructions to remove the access to at least one of the determined measures.

In an aspect combinable with any of the previous aspects, the contextual data is received from at least one source data provider.

In an aspect combinable with any of the previous aspects, the contextual data is received via an application programming interface (API).

In an aspect combinable with any of the previous aspects, the at least on source data provider comprises a social media provides, an email provider, the user's phone contacts, a messaging provider, a provider of at least one forum, a provider of an auction or selling site, or a provider of a recreational site.

In an aspect combinable with any of the previous aspects, the contextual data is received on a periodic basis.

In an aspect combinable with any of the previous aspects, the contextual data is received on daily or weekly.

In an aspect combinable with any of the previous aspects, the grouping includes the user.

In an aspect combinable with any of the previous aspects, the operations include: providing, to the user-interface, an industry strength scoring for the user determined according to the determined quantifiable measures.

In an aspect combinable with any of the previous aspects, the operations include: providing, to the user-interface, a regional strength scoring for the user determined according to the determined quantifiable measures.

In an aspect combinable with any of the previous aspects, the operations include: providing, to the user-interface, a best path to a decision maker determined according to the determined quantifiable measures.

In an aspect combinable with any of the previous aspects, the operations include: providing, to the user-interface, a validation of a recruiting rolodex determined according to the determined quantifiable measures.

In an aspect combinable with any of the previous aspects, the grouping includes a plurality of teams.

In an aspect combinable with any of the previous aspects, the access to the determined quantifiable measures is provided based on permissions received from the user-interface.

In an aspect combinable with any of the previous aspects, the operations include: providing the access to the determined quantifiable measures to a calendar application or an email client accessible by at least one of the members of the grouping or the user.

In an aspect combinable with any of the previous aspects, the contextual data comprises digital footprint data for the user and digital path data for the user.

Particular embodiments of the subject matter described in this disclosure can be implemented so as to realize one or more of the following advantages. The described system receives contextual data from disparate sources and employs machine learning determine a quantifiable measure of the dyadic ties between individuals. In some embodiments, a machine-learning model is trained to quantify the compounding impact of individual elements from the received contextual data as it related to the dyadic ties between individuals.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more embodiments of the present disclosure are set forth in the accompanying drawings and the description below. Other features and advantages of the present disclosure will be apparent from the description and drawings, and from the claims.

BRIEF DESCRIPTION OF THE DRAWINGS

A better understanding of the features and advantages of the present subject matter will be obtained by reference to the following detailed description that sets forth illustrative embodiments and the accompanying drawings of which:

FIGS. 3A-3C depict various non-limiting exemplary pages of a user interface (UI) by the described dyadic ties measurement system;

DETAILED DESCRIPTION

Figure 1A:
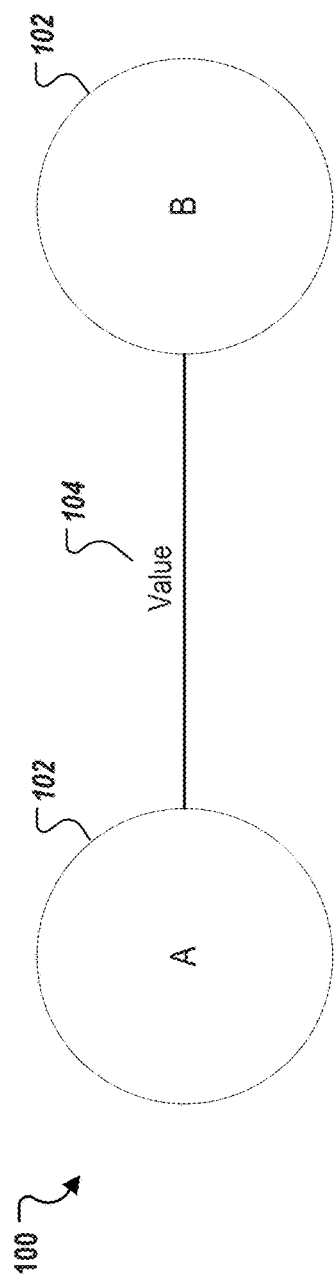
FIGS. 1A-1B depict various non-limiting exemplary weighted graphs.

Described herein, in certain embodiments, are dyadic ties measurement systems comprising: a user-interface; one or more processors; and a computer-readable storage device coupled to the one or more processors and having instructions stored thereon which, when executed by the one or more processors, cause the one or more processors to perform operations comprising: receiving contextual data for a user from at least one data source; processing the contextual data through a first machine-learning model to determine quantifiable measures of dyadic ties between the user and each of a plurality of individuals, the first machine-learning model trained with previously received contextual data of a plurality of other users; determining a grouping for the user based on the determined quantifiable measures, the grouping comprising at least one of the individuals; and providing, through a user-interface, access to the determined quantifiable measures to members of the grouping.

Also described herein, in certain embodiments, are non-transitory computer-readable storage media coupled to one or more processors and having instructions stored thereon which, when executed by the one or more processors, cause the one or more processors to perform a operations comprising: receiving contextual data for a user from at least one data source; processing the contextual data through a first machine-learning model to determine quantifiable measures of dyadic ties between the user and each of a plurality of individuals, the first machine-learning model trained with previously received contextual data of a plurality of other users; determining a grouping for the user based on the determined quantifiable measures, the grouping comprising at least one of the individuals; and providing, through a user-interface, access to the determined quantifiable measures to members of the grouping.

Also described herein, in certain embodiments, are computer-implemented methods for determining quantifiable measures of dyadic ties comprising: receiving contextual data for a user from at least one data source; processing the contextual data through a first machine-learning model to determine quantifiable measures of dyadic ties between the user and each of a plurality of individuals, the first machine-learning model trained with previously received contextual data of a plurality of other users; determining a grouping for the user based on the determined quantifiable measures, the grouping comprising at least one of the individuals; and providing, through a user-interface, access to the determined quantifiable measures to members of the grouping.

Certain Definitions

Unless otherwise defined, all technical terms used herein have the same meaning as commonly understood by one of ordinary skill in the art to which the present subject matter belongs. As used in this specification and the appended claims, the singular forms "a," "an," and "the" include plural references unless the context clearly dictates otherwise. Any reference to "or" herein is intended to encompass "and/or" unless otherwise stated.

As used herein, the term "real-time" refers to transmitting or processing data without intentional delay given the processing limitations of a system, the time required to accurately obtain data and images, and the rate of change of the data and images. In some examples, "real-time" is used to describe the presentation of information obtained from components of embodiments of the present disclosure.

Contextual data includes data that provides context to a person, entity, or group. Contextual data can be taken from various sources, such as, websites, email, social media, socioeconomic background, educational history, work history and so forth. In some embodiments, contextual data includes Digital path data and/or digital footprint data.

Digital path data includes programs, websites, service, and systems that individuals (e.g., users) use. For example, a system that is part of a user's daily routine.

Digital footprint data includes the "trail" of data that a user creates while using programs, websites, service, and systems (e.g., when a user's users the Internet). Digital footprint data includes, for example, websites visited, emails sent, and information submitted to online services.

A data enricher includes providers and processes used to enhance, refine, or otherwise improve raw data. A data enricher increases the value of data and shows a common imperative of proactively using this data in various ways.

Ties include the multidimensional social relationships with co-workers, peers, neighbors, and others that an individual builds. Such ties yield social capital that can be drawn upon for information, resources, and support.

A strong tie is someone whom an individual knows well. For example, someone for whom the individual has a number his/her phone or with whom he/she interacts on social networking sites. For individuals with strong ties between them, there is good two-way communication, and even if they do not know everything about one other, they know each other well enough such that information flows freely. Additionally, individuals with strong ties typically know the same information.

An industry strength scoring includes a score based on the cumulative total of relationship scores within a given industry or vertical.

Regional strength scoring includes a score based on the cumulative total of relationship scores within a given region or territory.

Dyadic Ties Measurement System

Embodiments of the present disclosure are generally directed to systems, platforms, and methods for determining quantifiable measures of dyadic ties between individuals. More particularly, embodiments of the present disclosure are directed to a system that enables a user to provide members (e.g., other system users) access to quantifiable measures of dyadic ties between themselves and other individuals with whom the user interacts. In some embodiments, the described dyadic ties measurement system includes a machine-learning model trained with previously received contextual data (e.g., of system users or anonymous data). In some embodiments, contextual data is received based on permissions and access granted by the user. In some embodiments, the contextual data is processed by the trained machine-learning model to determine the quantifiable measures of dyadic ties between the user individuals. In some embodiments, the quantifiable measures are employed to determine the strength of relationships, provide industry strength scoring and regional strength scoring, determine a path to decision makers, request introductions through the platform, determine a team or social/business grouping, and so forth. In some embodiments, the content of the contextual data is enhanced by data enrichers, which provide, for example, deduplication and chronological information.

Figure 1B:
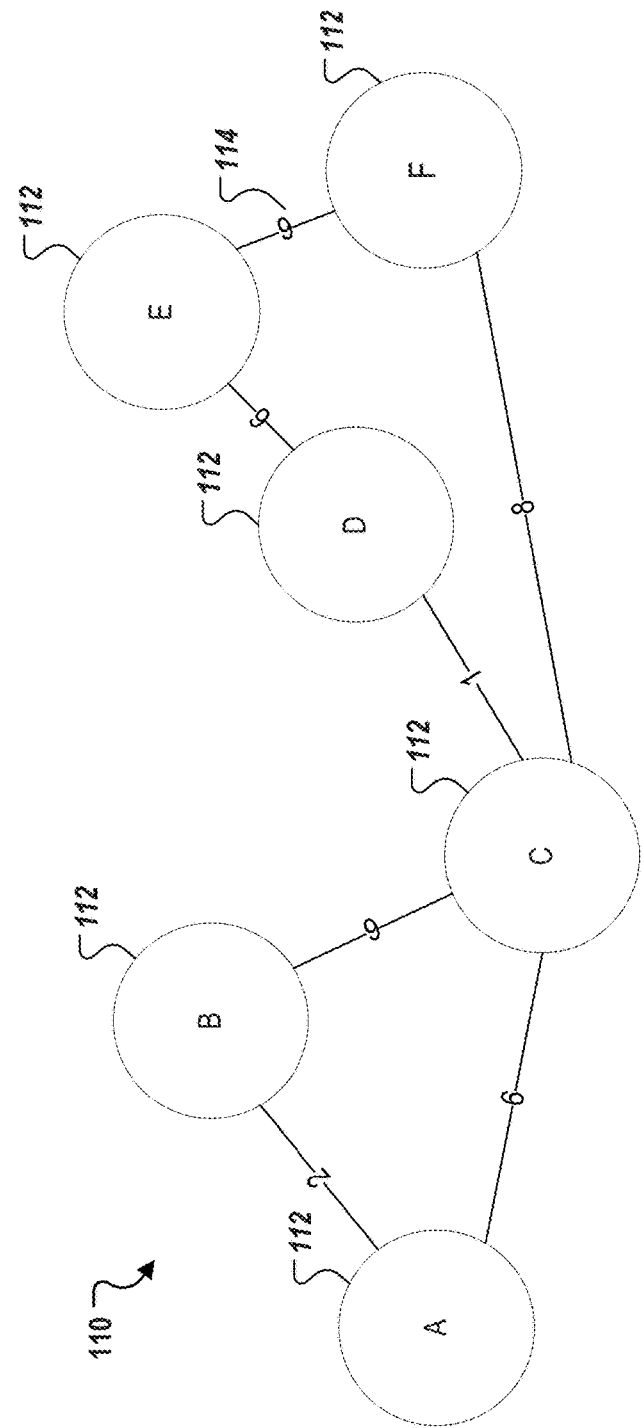

FIGS. 1A and 1B depict example weighted graphs 100 an 110 respectively. The example weighted graph 100 depicts two circles 102 representing actors A and B. The line 104 connecting the circles 102 shows an assigned value. In some embodiments, the assigned value represents a tie strength or a measure of the dyadic ties between actors A and B between the actors A and B. Tie strength can attach values to ties, representing quantitative attributes, strength of relationship, frequency of communication, information of communication, information capacity and bandwidth, or physical distance.

The example weighted graph 110 is a more complicated graph and depicts circles 102 that representing a set of actors A, B, C, D, E, and F and lines 114 that represent a set of dyadic ties between each of the actors. In some embodiments, the described system processes the massive amount of information that lives on the Internet and bullet down to its two smallest forms, the dyadic relationship between individuals. A measure (e.g., a score value from 0 to 100 for each relationship between individuals is determined through a trained machine learning model and provided to users of the system. In some embodiments, the measures provide a user with information regarding the people he or she knows and how well he or she you knows them.

In some embodiments, one important aspect represented through the information in the depicted weighted graphs 100 and 110 is a retaking the available data available from a plethora a systems and service to determine who a user's actual real-life friends are and not with whom, for example, a social media platform thinks the user should connect, friend, or follow.

Figure 2:
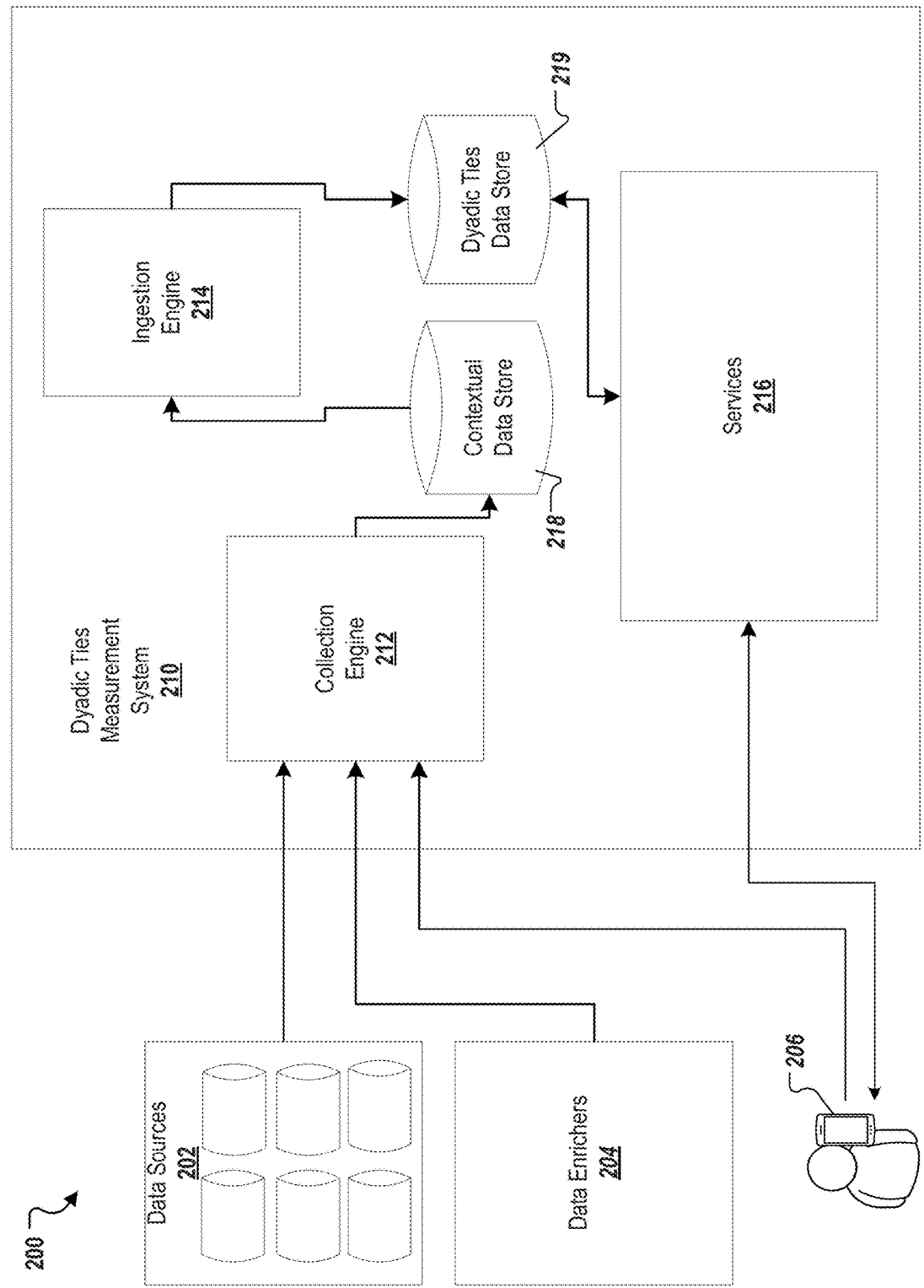
FIG. 2 depicts a non-limiting exemplary architecture of the described dyadic ties measurement system.

FIG. 2 depicts an example architecture 200 for the described dyadic ties measurement system. As depicted, the example architecture 200 includes data sources 202, data enrichers 204, user device 206, and a dyadic ties measurement system 210. As depicted, the dyadic ties measurement system 210 includes a collection engine 212, an ingestion engine 214, services modules 216, a contextual data store 218, and a dyadic ties data store 219. The contextual data store 218 and the dyadic ties data store 219 may be any suitable type of data store, such as a database. In some embodiments, the contextual data store 218 and the dyadic ties data store 219 may be comprised within the same data store. Data stores are described in greater detail below in the data store section.

In some embodiments, the dyadic ties measurement system 210 receives or retrieves contextual data for users from the data sources 202. In some embodiments, the dyadic ties measurement system 210 retrieves the contextual data via an API. In some embodiments, users grant permission to the dyadic ties measurement system 210 to receive or retrieve the contextual data from the data sources 202. In some embodiments, users provide credential to the dyadic ties measurement system 210 for at least one of the data sources 202. Example data sources 202 include, but are not limited to, exchange servers, cloud-based Office 365, analytics websites, social media websites. In some embodiments, the received contextual data includes personal, work, and recreational data for users.

In some embodiments, the dyadic ties measurement system 210 employs the data enrichers 204 to provide additional information (e.g., validation data) regarding users. Such additional data can be employed to, for example, clean up (e.g., merge) contact information. In some embodiments, the data enrichers 204 provide services though an API. In some embodiments, the services provided by the data enrichers 204 are invoked using a key value pair, such as First Name, Last Name, and City. In some embodiments, the data enrichers 204 provide the dyadic ties measurement system 210 enriched and verified information that may include, for example, an individual's current city, full legal name, and so forth. In some embodiments, the data enrichers 204 provide information for deduplication of information for an individual. In some embodiments, the data enrichers 204 provide historical information about an individual, such as pervious addresses or phone numbers.

User device 206 can include any appropriate type of computing device. Such computing devices are described in greater detail below in the section describing the computing devices 602, 604, and 606 depicted in FIG. 6A. In some embodiments, the dyadic ties measurement system 210 receives or retrieves contextual data for users from user devices, such as user device 206. For example, the dyadic ties measurement system 210 may access the user device 206 to retrieve a list of contacts.

In some embodiments, a respective user associate with the user device 206 may provide credentials or permissions to access the user device 206. In some embodiments, the dyadic ties measurement system 210, via the collection engine 212, employs the validation data received from the data enrichers 204 to clean up the contact data. In some embodiments, the dyadic ties measurement system 210 may receive responses to a series of questions (e.g., who is the best supervisor or peer with whom you have worked) from the user device 206. In some embodiments, the dyadic ties measurement system 210 may receive reviews or evaluations, such as peer reviews, from the user device 206.

In some embodiments, the collection engine 212 collects the contextual data from the above described data sources 202, data enrichers 204, user device 206; processes the received data; and persists the processed data to the contextual data store 218. In some embodiments, the collection engine 212 collects data by pulling from the sources (e.g., by calling an API). In some embodiments, the data is pushed from the sources (e.g., via an API provided by the system) to the collection engine 212. In some embodiments, the data is collected periodically, such as hourly, daily, or weekly.

In some embodiments, the collection engine 212 processes the received contextual data and validation data through a machine-learning model to clean up (e.g., merge, order, validate, verify, filter, etc.) the data contextual. For example, the collection engine 212 may determine current and historical contact information for a user by processing the received data through the machine-learning model. In some embodiments, the machine-learning model employed by the collection engine 212 is trained with previously received validation data and contextual data. In some embodiments, users can manually clean up the received data via the user device 206 through a UI, such as the UI depicted in FIGS. 3A-3C.

In some embodiments, the ingestion engine 214 processes the collected contextual data persisted to the contextual data store 218 to determined quantifiable measures of dyadic ties between individuals. In some embodiments, the ingestion engine 214 processes the contextual data through a machine-learning model to determine quantifiable measures of dyadic ties between users and individuals. For example, the machine-learning model can be process a user's daily digital path from work communications or personal daily digital journeys from personal email communication. As another example, the model can process a recreational digital path of a user, such as what the user follows or does on social media, the team that he or she follows on a sports site, fantasy or recreational leagues and/or clubs of which the user is a member, and so forth. In some embodiments, based on this information, the model can determine a consolidated snapshot of who a person knows and how well he or she knows them. This information can be employed to determine the quantifiable measures of dyadic ties between the individuals.

The machine-learning model may also ingest the digital footprints of users on a daily basis to determine who a user knows and how well. In some embodiments, the measures of dyadic ties between individuals are determined based on the accuracy or timeliness of the information a particular individual has for another. For example, how accurate and up-to-date a contact record is for a person (e.g., does the contact include the person's middle name, does the contact include a person's new address) is an indication of how well the contact holder knows that person. In some embodiments, the determined measures of dyadic ties between individuals are determined based on the type and/or length of a relationship. For example, determining that a person is a family member or friend from childhood friend indicates a strong dyadic tie. Other types of information collected and processed by the system include: who a person messages and how often; whether contact data is both valid and current; does the contact data include a personal phone number or email; does the contact data include any historical information, such as an old address; and so forth.

In some implementations, the machine-learning model quantifies a compounding impact of the received contextual data to determine the measures of dyadic ties. Once the contextual data is processes, the determined measures indicate who a person knows and how much trust exists between them. In some implementations, the trained machine-learning model includes weighted values. For example, details such as the amount of historical information, the length of a relationship, how current is the connection, the type of information exchanged and discussed, can each be weighted respectively to each other. In some embodiments, the ingestion engine 214 stores the determined measures along with other relevant user data to the dyadic ties data store 219.

Figure 3A:
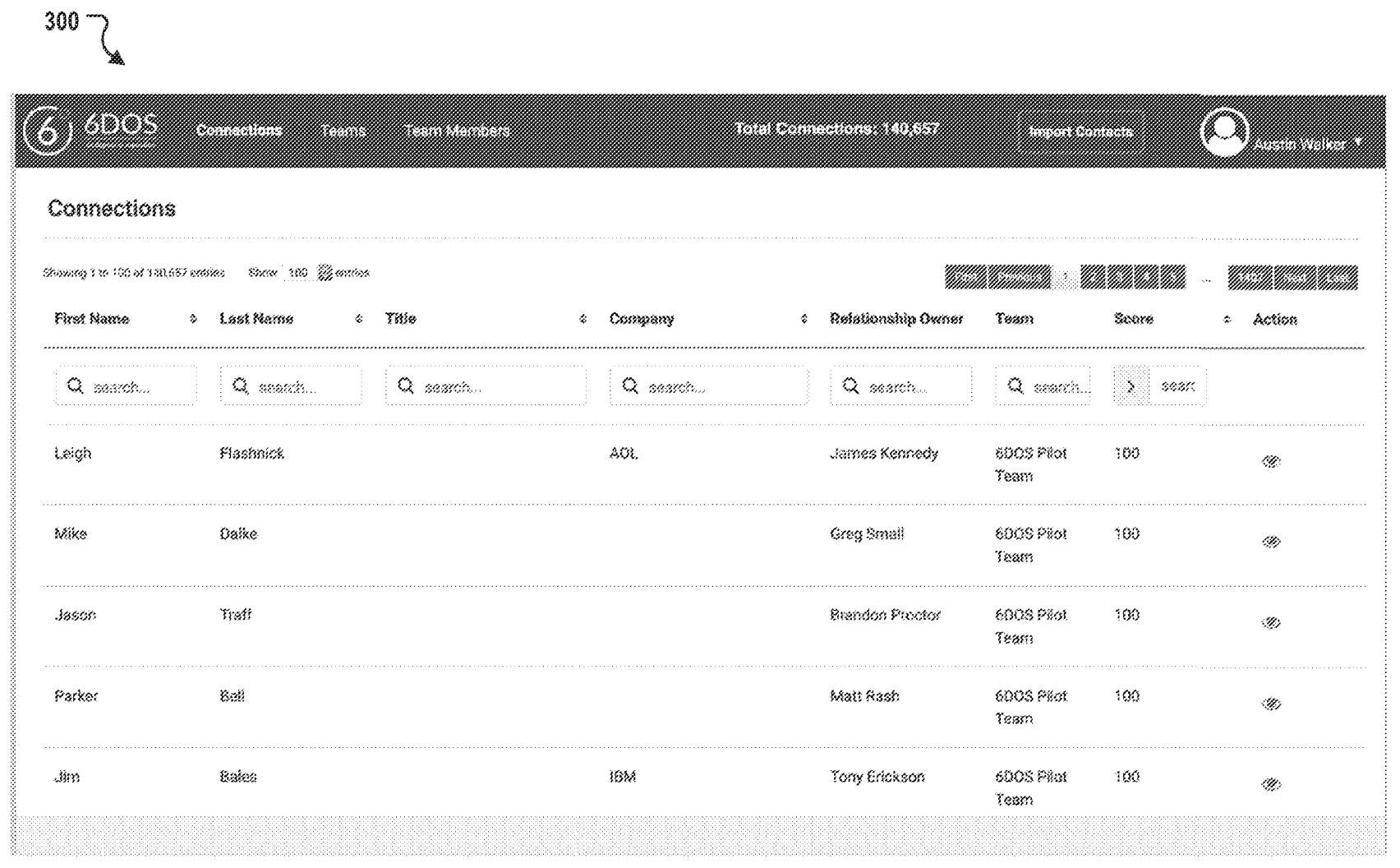
Figure 3B:
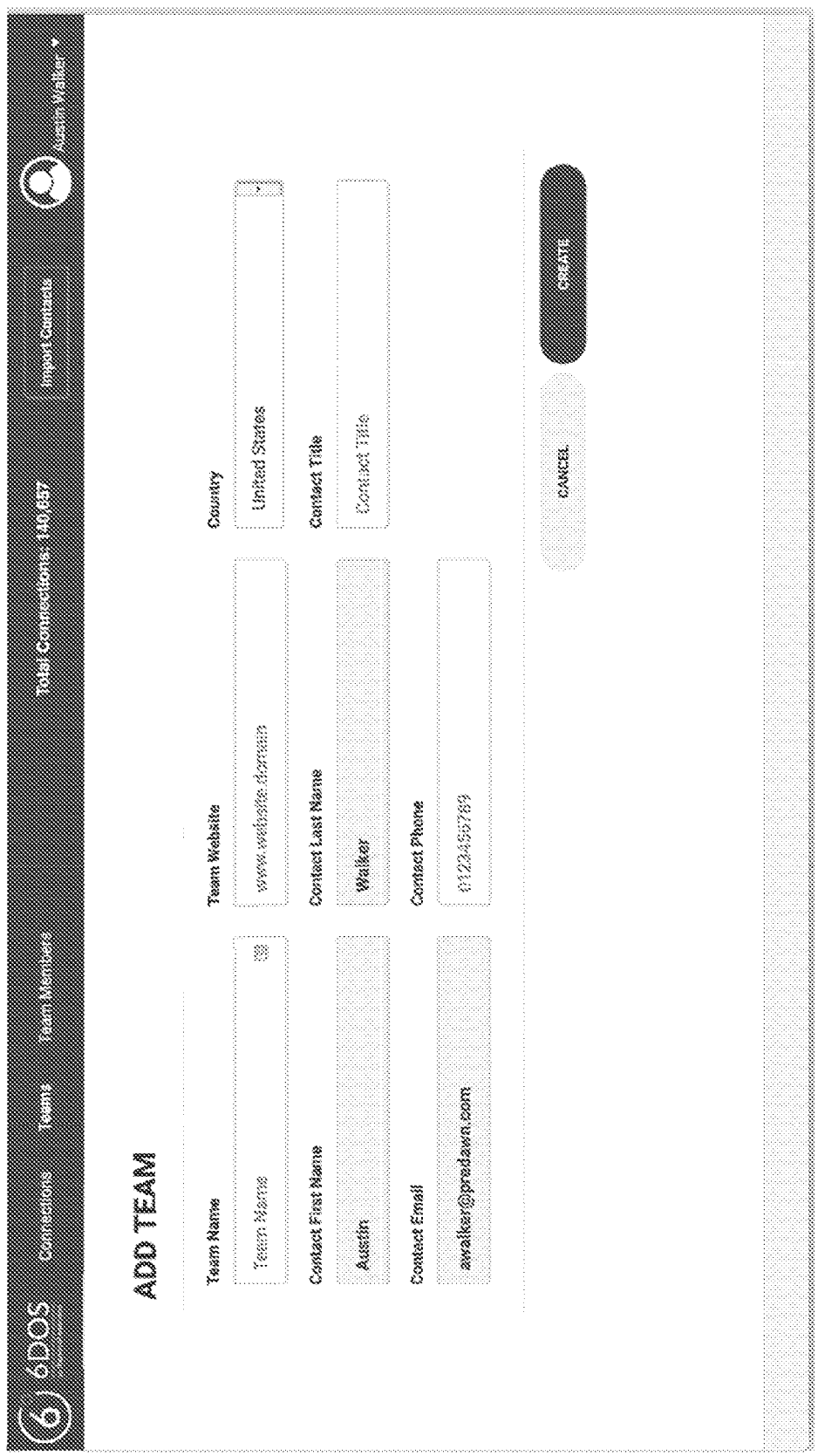
Figure 3C:

The services modules 216 provide services to system users. In some embodiments, services are provided through a UI, such as depicted in FIGS. 3A-3C. For example, users can correct a value or remove a connection using the UI. In some embodiments, services modules 216 provide the measures to calendar application or email clients (e.g., a user can see who is connected to clients or people with whom he or she has a meeting).

In some embodiments, a user is grouped with other users into teams. In some embodiments, the members of these teams may be based on settings provided to the dyadic ties measurement system 210 through, for example, an administrative UI. In some embodiments, users may select which teams to join. In some embodiments, teams may be determined automatically by the system 210 based on the determined measures. For example, a sales team may set up so that the members can pool contact information (connections), accessed through the services modules 216, to see who the various team members know and how well.

Example Pages

FIGS. 3A-3C depict various example pages provide by the described dyadic ties measurement system.

FIG. 3A depicts an example connections page 300 for the described system. The example connections page 300 can be employ to provided, for example, relationship owners (e.g., other users or individuals) that are connected to a user and how well each is connected (e.g., under relationship score or measurement). In some embodiments, a higher score value indicates a higher number of connections, conversations, knowledge, and so forth between the individuals. As depicted, a user can search for people by company, title, name, and so forth.

FIG. 3B depicts an example usage page 310 for the described system. The example usage page 310 provides information regarding the usage of teams. In some embodiments, user can view each of the contacts of team members. In some embodiments, team members can restrict which contacts can be viewed by various team members or the team in its entirety. In some embodiments, users can not view individuals that are not members of their respective teams. In some embodiments, user can create and invite or add people to their teams.

FIG. 3C depicts an example ingestion usage page 320 for the described system. The example ingestion page 320 can be employed to "ingest" contacts and connection data from, for example Google™, Office 365™, LinkedIn™, iCloud™, or vCard attachment files (.vcf is a common contact database export file type). In some embodiments, the connection data is processed through a trained machine-learning model to determine quantifiable measures of dyadic ties between the respective user and the individuals whose information is includes within the connection data.

Example Processes

Figure 4:
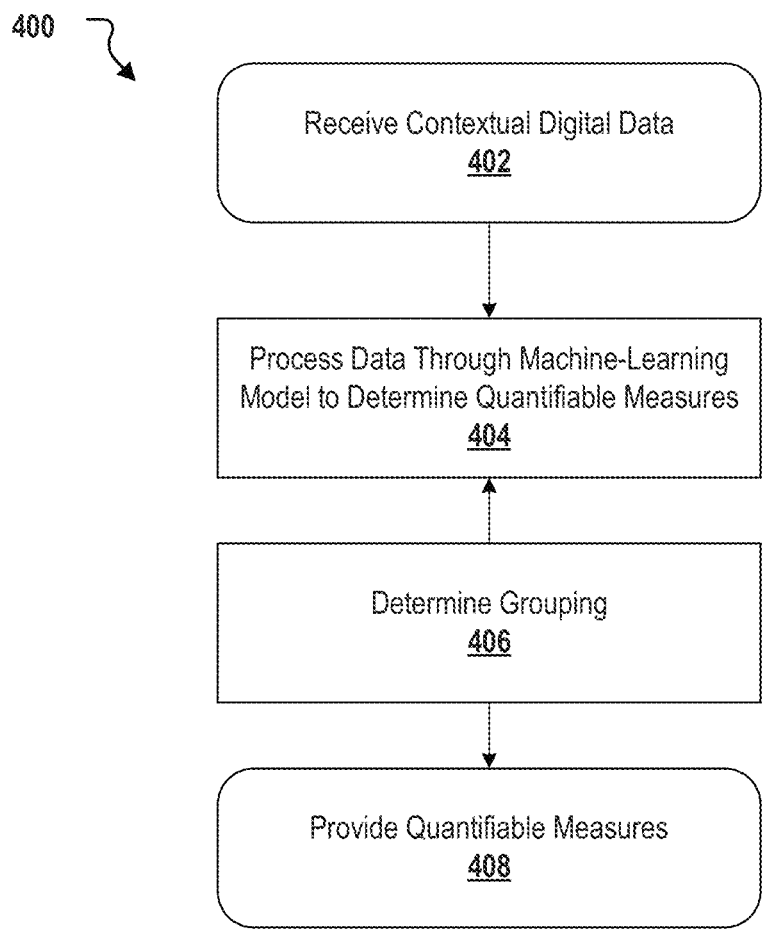
FIG. 4 depict flowcharts of a non-limiting exemplary process that can be implemented by embodiments of the present disclosure.

FIG. 4 depicts a flowchart of an example process 400 that can be implemented by embodiments of the present disclosure. The example process 400 can be implemented by the components of the described dyadic ties measurement system, such as described above in FIG. 2. The example process 400 generally shows in more detail how quantifiable measures of dyadic ties between users can be determined by processing contextual data through a first machine-learning model and employed within the described system.

For clarity of presentation, the description that follows generally describes the example process 400 in the context of FIGS. 1A-3C, and 5-6C. However, it will be understood that the process 400 may be performed, for example, by any other suitable system, environment, software, and hardware, or a combination of systems, environments, software, and hardware as appropriate. In some embodiments, various operations of the process 400 can be run in parallel, in combination, in loops, or in any order.

At 402, contextual data for a user is received from at least one data source. In some embodiments, the contextual data is received from at least one source data provider. In some embodiments, the contextual data is received via an API. In some embodiments, the at least on source data provider comprises a social media provides, an email provider, the user's phone contacts, a messaging provider, a provider of at least one forum, a provider of an auction or selling site, or a provider of a recreational site. In some embodiments, the contextual data is received on a periodic basis. In some embodiments, the contextual data is received on daily or weekly. In some embodiments, the contextual data comprises digital footprint data for the user and digital path data for the user. From 402, the process 400 proceeds to 404.

At 404, the contextual data is processed through a first machine-learning model to determine quantifiable measures of dyadic ties between the user and each of a plurality of individuals. In some embodiments, the first machine-learning model is trained with previously received contextual data of a plurality of other users. In some embodiments, the first machine-learning model is retrained with the determined quantifiable measures. In some embodiments, the quantifiable measures of dyadic ties are determined based on user contact detail quality, a frequency of communication, information within communications, information capacity and bandwidth, physical distance, social network ties, or timeliness of when contact information was updated. In some embodiments, the first machine-learning model determines the quantifiable measures based on a compounding impact of individual elements from the contextual data. In some embodiments, the first machine-learning model classifies relationships between the user and each of the individuals according to type, length, and age of the respective parties at a time when the respective relationship began. In some embodiments, the first machine-learning model comprises weighted values for the classifications. In some embodiments, before processing the contextual data through the first machine-learning model, validation data for the user is received from at least one data enricher, and the contextual data and the validation data is processed through a second machine-learning model to determine contact information for the user and the individuals, the second machine-learning model trained with previously received validation data and the previously received contextual data of the other users. In some embodiments, the received validation data and the determined contact information is processed through the first machine-learning model to determine the quantifiable measures. In some embodiments, the second machine-learning model merges the processed data to determine and verify current and previous contact information for the user and the individuals. In some embodiments, the second machine-learning model merges the processed data to determine a chorological order of the contact information. In some embodiments, corrections for the determined contact information are received from the user-interface. In some embodiments, the first machine-learning model is retrained with the corrections. From 404, the process 400 proceeds to 406.

At 406, a grouping for the user is determined based on the determined quantifiable measures, the grouping comprising at least one of the individuals. In some embodiments, the grouping includes the user. In some embodiments, the grouping comprises a team. From 406, the process 400 proceeds to 408.

At 408, access to the determined quantifiable measures is provided to members of the grouping through a UI. In some embodiments, instructions to remove the access to at least one of the determined measures are received from the UI. In some embodiments, an industry strength scoring for the user determined according to the determined quantifiable measures is provided to the UI. In some embodiments, a regional strength scoring for the user determined according to the determined quantifiable measures is provided to the UI. In some embodiments, a best path to a decision maker determined according to the determined quantifiable measures is provided to the UI. In some embodiments, a validation of a recruiting rolodex determined according to the determined quantifiable measures is provided to the UI. In some embodiments, the access to the determined quantifiable measures is provided based on permissions received from the UI. In some embodiments, the access to the determined quantifiable measures is provided to a calendar application or an email client accessible by at least one of the members of the grouping or the user. From 408, the process 400 ends.

Processing Devices and Processors

In some embodiments, the platforms, systems, media, and methods described herein include a computer, or use of the same. In further embodiments, the computer includes one or more hardware central processing units (CPUs) or general purpose graphics processing units (GPGPUs) that carry out the device's functions. In still further embodiments, the computer comprises an operating system configured to perform executable instructions. In some embodiments, the computer is optionally connected a computer network. In further embodiments, the computer is optionally connected to the Internet such that it accesses the World Wide Web. In still further embodiments, the computer is optionally connected to a cloud computing infrastructure. In other embodiments, the computer is optionally connected to an intranet. In other embodiments, the computer is optionally connected to a data storage device.

In accordance with the description herein, suitable computers include, by way of non-limiting examples, server computers, desktop computers, laptop computers, notebook computers, sub-notebook computers, netbook computers, netpad computers, handheld computers, Internet appliances, mobile smartphones, tablet computers, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the computer includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage or memory device. The storage or memory device is one or more physical apparatuses used to store data or programs on a temporary or permanent basis. In some embodiments, the device is volatile memory and requires power to maintain stored information. In some embodiments, the device is non-volatile memory and retains stored information when the computer is not powered. In further embodiments, the non-volatile memory comprises flash memory. In some embodiments, the volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, compact disc read-only memory (CD-ROM), digital versatile disc (DVD), flash memory devices, magnetic disk drives, magnetic tapes drives, optical disk drives, and cloud computing based storage. In further embodiments, the storage and/or memory device is a combination of devices such as those disclosed herein.

In some embodiments, the computer includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with a computer, such as a virtual reality (VR) headset. In further embodiments, suitable VR headsets include, by way of non-limiting examples, HTC Vive, Oculus Rift, Samsung Gear VR, Microsoft HoloLens, Razer Open-Source Virtual Reality (OSVR), FOVE VR, Zeiss VR One, Avegant Glyph, Freefly VR headset, and the like. In still further embodiments, the display is a combination of devices such as those disclosed herein.

In some embodiments, the computer includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 5:
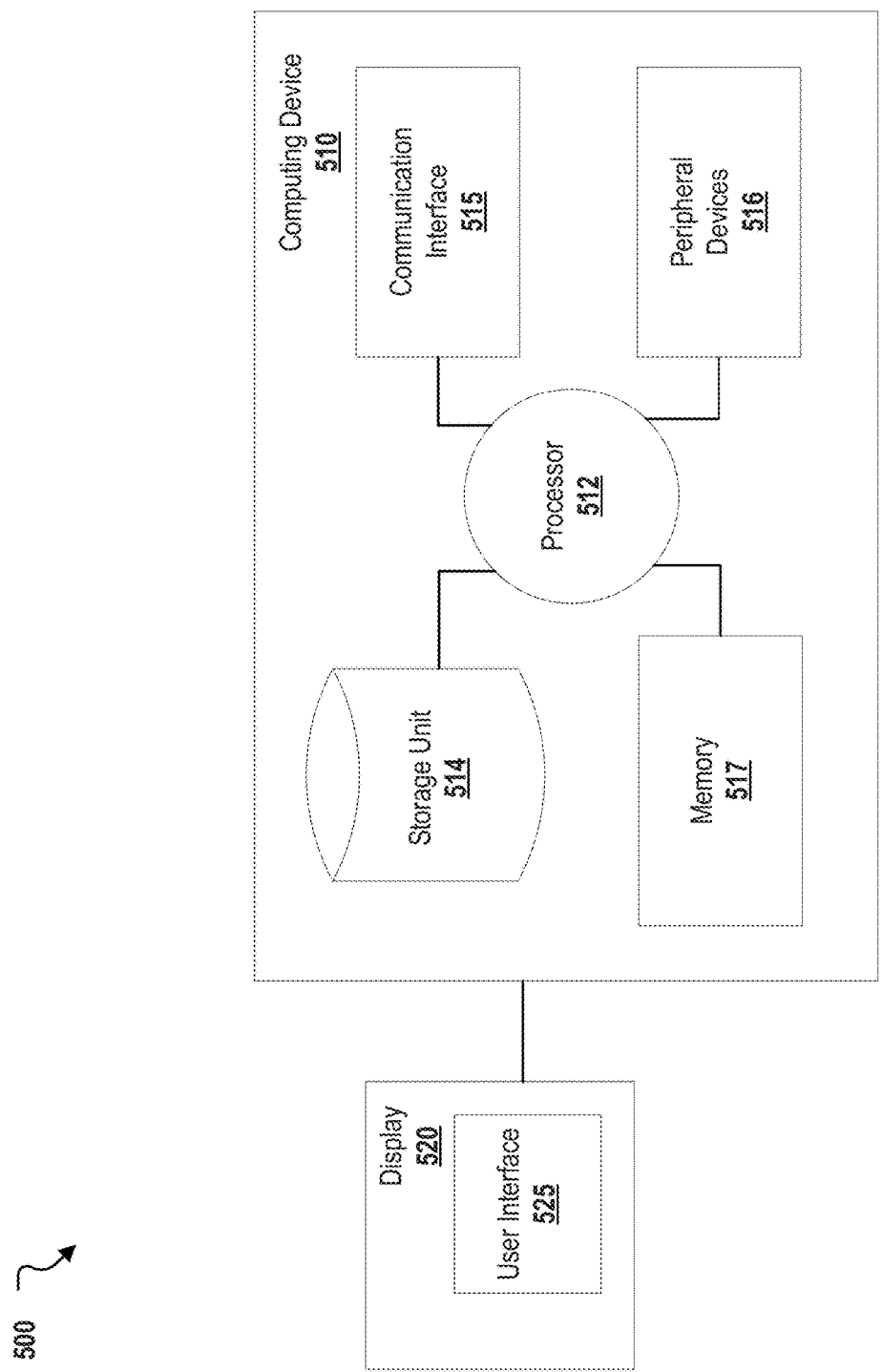
FIG. 5 depicts a non-limiting exemplary computer system that can be programmed or otherwise configured to implement methods or systems of the present disclosure.

Computer control systems are provided herein that can be used to implement the platforms, systems, media, and methods of the disclosure. FIG. 5 depicts an example computer system 500 that can be programmed or otherwise configured to implement platforms, systems, media, and methods of the present disclosure. For example, the computing device 510 can be programmed or otherwise configured to display a user-interface or application provided by the described dyadic ties measurement system.

In the depicted embodiment, the computing device 510 includes a CPU (also "processor" and "computer processor" herein) 512, which is optionally a single core, a multi core processor, or a plurality of processors for parallel processing. The computing device 510 also includes memory or memory location 517 (e.g., random-access memory, read-only memory, flash memory), electronic storage unit 514 (e.g., hard disk), communication interface 515 (e.g., a network adapter) for communicating with one or more other systems, and peripheral devices 516, such as cache, other memory, data storage and/or electronic display adapters. In some embodiments, the memory 517, storage unit 514, communication interface 515, and peripheral devices 516 are in communication with the CPU 512 through a communication bus (solid lines), such as a motherboard. The storage unit 514 comprises a data storage unit (or data repository) for storing data. The computing device 510 is optionally operatively coupled to a computer network, such as the network 610 depicted and described in FIG. 6A, with the aid of the communication interface 515. In some embodiments, the computing device 510 is configured as a back-end server deployed within the described dyadic ties measurement system.

In some embodiments, the CPU 512 can execute a sequence of machine-readable instructions, which can be embodied in a program or software. The instructions may be stored in a memory location, such as the memory 517. The instructions can be directed to the CPU 512, which can subsequently program or otherwise configure the CPU 512 to implement methods of the present disclosure. Examples of operations performed by the CPU 512 can include fetch, decode, execute, and write back. In some embodiments, the CPU 512 is part of a circuit, such as an integrated circuit. One or more other components of the computing device 510 can be optionally included in the circuit. In some embodiments, the circuit is an application specific integrated circuit (ASIC) or a FPGA.

In some embodiments, the storage unit 514 stores files, such as drivers, libraries and saved programs. In some embodiments, the storage unit 514 stores user data, e.g., user preferences and user programs. In some embodiments, the computing device 510 includes one or more additional data storage units that are external, such as located on a remote server that is in communication through an intranet or the Internet.

In some embodiments, the computing device 510 communicates with one or more remote computer systems through a network. For instance, the computing device 510 can communicate with a remote computer system. Examples of remote computer systems include personal computers (e.g., portable PC), slate or tablet PCs (e.g., Apple® iPad, Samsung® Galaxy Tab, etc.), smartphones (e.g., Apple® iPhone, Android-enabled device, Blackberry®, etc.), or personal digital assistants. In some embodiments, a user can access the computing device 510 via a network.

In some embodiments, the platforms, systems, media, and methods as described herein are implemented by way of machine (e.g., computer processor) executable code stored on an electronic storage location of the computing device 510, such as, for example, on the memory 517 or the electronic storage unit 514. In some embodiments, the CPU 512 is adapted to execute the code. In some embodiments, the machine executable or machine readable code is provided in the form of software. In some embodiments, during use, the code is executed by the CPU 512. In some embodiments, the code is retrieved from the storage unit 514 and stored on the memory 517 for ready access by the CPU 512. In some situations, the electronic storage unit 514 is precluded, and machine-executable instructions are stored on the memory 517. In some embodiments, the code is pre-compiled. In some embodiments, the code is compiled during runtime. The code can be supplied in a programming language that can be selected to enable the code to execute in a pre-compiled or as-compiled fashion.

In some embodiments, the computing device 510 can include or be in communication with an electronic display 520. In some embodiments, the electronic display 520 provides a UI 525 that depicts various screen such as the examples depicted in FIGS. 3A-3D.

Figure 6A:
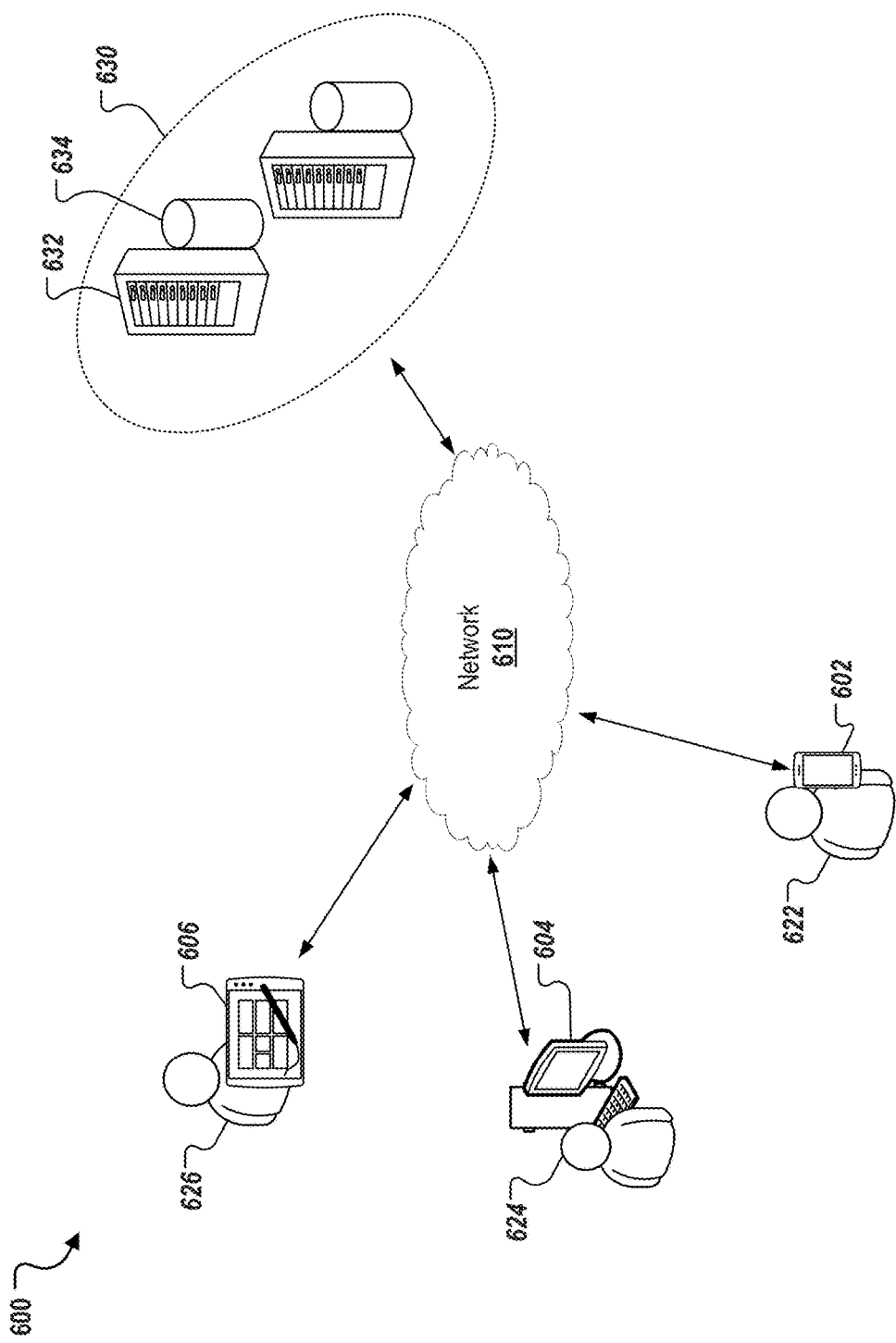
FIG. 6A depicts a non-limiting example environment that can be employed to execute embodiments of the present disclosure.

FIG. 6A depicts an example environment 600 that can be employed to execute embodiments of the present disclosure. The example system 600 includes computing devices 602, 604, 606, a back-end system 630, and a network 610. In some embodiments, the network 610 includes a local area network (LAN), wide area network (WAN), the Internet, or a combination thereof, and connects web sites, devices (e.g., the computing devices 602, 604, and 606) and back-end systems (e.g., the back-end system 630). In some embodiments, the network 610 includes the Internet, an intranet, an extranet, or an intranet and/or extranet that is in communication with the Internet. In some embodiments, the network 610 includes a telecommunication or a data network. In some embodiments, the network 610 can be accessed over a wired or a wireless communications link. For example, mobile computing devices (e.g., the smartphone device 602 and the tablet device 606), can use a cellular network to access the network 610.

The described dyadic ties measurement system may be employed within the example environment 600 to, for example, employ machine learning/AI techniques for processing contextual data through a machine-learning algorithm to quantifiable measures of dyadic ties between users, the machine learning algorithm having been trained with received contextual data.

In some examples, the users 622, 624, and 626 interact with the described dyadic ties measurement system through a graphical user interface (GUI), such as depicted in FIGS. 3A-3C, or application that is installed and executing on their respective computing devices 602, 604, and 606. In some examples, the computing devices 602, 604, and 606 provide viewing data to screens with which the users 622, 624, and 626, can interact. In some embodiments, the computing devices 602, 604, 606 are sustainably similar to computing device 510 depicted in FIG. 5. The computing devices 602, 604, 606 may each include any appropriate type of computing device, such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. Three user computing devices 602, 604, and 606 are depicted in FIG. 6A for simplicity. In the depicted example environment 600, the computing device 602 is depicted as a smartphone, the computing device 604 is depicted as a tablet-computing device, and the computing device 606 is depicted a desktop computing device. It is contemplated, however, that embodiments of the present disclosure can be realized with any of the appropriate computing devices, such as those mentioned previously. Moreover, embodiments of the present disclosure can employ any number of devices as required.

In the depicted example environment 600, the back-end system 630 includes at least one server device 632 and at least one data store 634. In some embodiments, the device 632 is sustainably similar to computing device 510 depicted in FIG. 5. In some embodiments, the back-end system 630 may include server-class hardware type devices. In some embodiments, the server device 632 is a server-class hardware type device. In some embodiments, the back-end system 630 includes computer systems using clustered computers and components to act as a single pool of seamless resources when accessed through the network 610. For example, such embodiments may be used in data center, cloud computing, storage area network (SAN), and network attached storage (NAS) applications. In some embodiments, the back-end system 630 is deployed using a virtual machine(s). In some embodiments, the data store 634 is a repository for persistently storing and managing collections of data. Example data store that may be employed within the described dyadic ties measurement system include data repositories, such as a database as well as simpler store types, such as files, emails, and so forth. In some embodiments, the data store 634 includes a database. In some embodiments, a database is a series of bytes or an organized collection of data that is managed by a database management system (DBMS).

In some embodiments, the at least one server system 632 hosts one or more computer-implemented services, such as described above, provided by the described dyadic ties measurement system that users 622, 624, and 626 can interact with using the respective computing devices 602, 604, and 606.

Figure 6B:
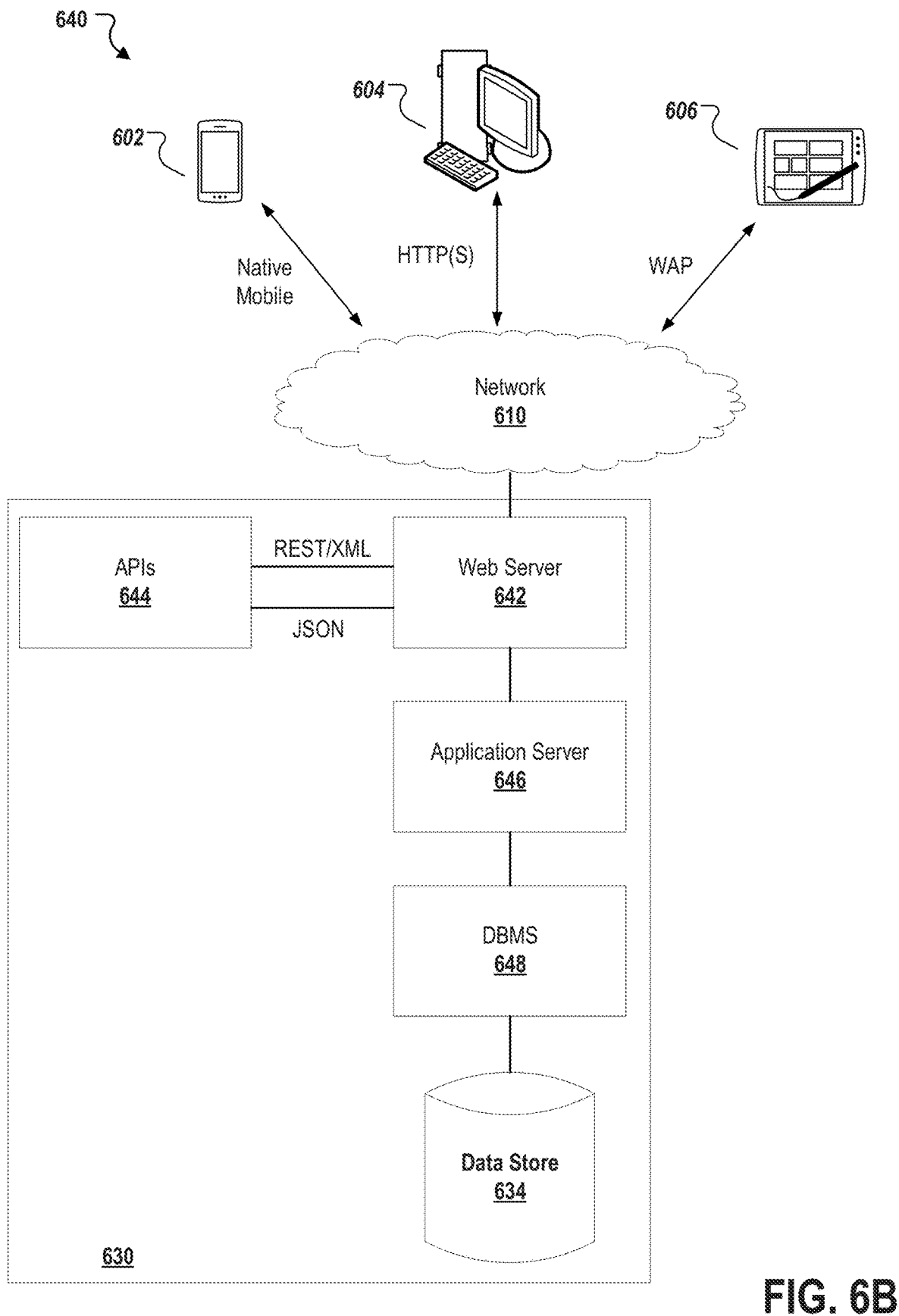
FIG. 6B depicts a non-limiting example application provision system that can be provided through an environment and employed to execute embodiments of the present disclosure.

FIG. 6B depicts an example application provision system 640 that can be provided through an environment, such as the example environment 600 and employed to execute embodiments of the present disclosure. As depicted, the example application provision system 640 includes the back-end system 630 configured to include one or more data stores 634 accessed by a DBMS 648. Suitable DBMSs include Firebird, MySQL, PostgreSQL, SQLite, Oracle Database, Microsoft SQL Server, IBM DB2, IBM Informix, SAP Sybase, SAP Sybase, Teradata, and the like. As depicted, the example application provision system 640 includes the back-end system 630 configured to include one or more application severs 646 (such as Java servers, .NET servers, PHP servers, and the like) and one or more web servers 642 (such as Apache, IIS, GWS and the like). The web server(s) 642 optionally expose one or more web services via an API 644 via the network 610. In some embodiments, the example application provision system 640 provides browser-based or mobile native UIs to the computing devices 602, 604, 606.

Figure 6C:
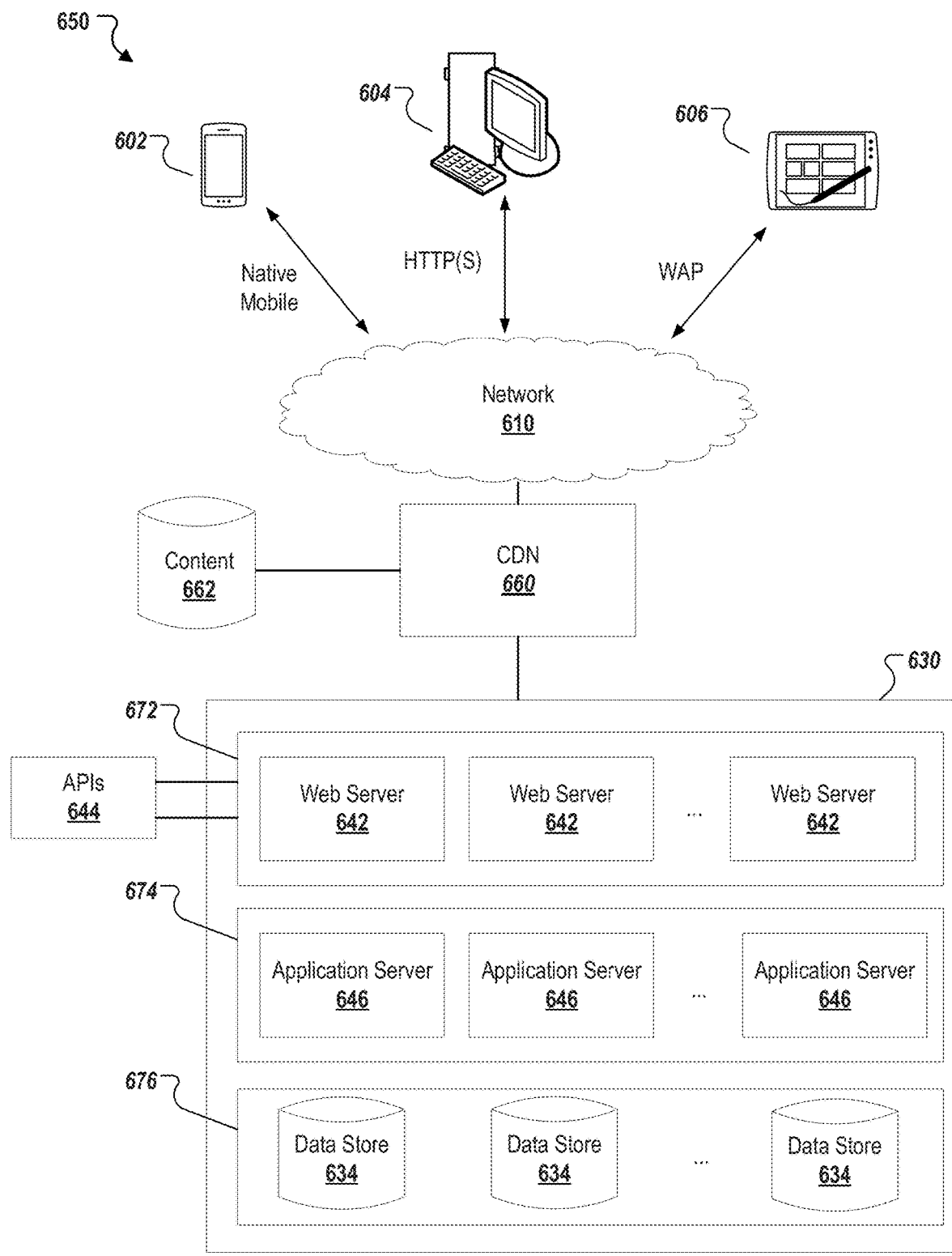
FIG. 6C depicts a non-limiting example cloud-based architecture of an application provision system that can be provided through an environment and employed to execute embodiments of the present disclosure.

FIG. 6C depicts an example cloud-based architecture of an application provision system 650 that can be provided through an environment, such as the example environment 600, and employed to execute embodiments of the present disclosure. The application provision system 650 includes the back-end system 630 configured to include elastically load balanced, auto-scaling web server resources 672, application server resources 674, as well as synchronously replicated stores 676. In some embodiment, of the example cloud-based architecture of an application provision system 650, content 662 of services are provided through a content delivery network (CDN) 660 coupled with the back-end system 630. In some embodiments, a CDN is a geographically distributed network of proxy servers and respective data centers that provides high availability and high performance through distributing the service spatially relative to the receiving devices, such as commuting devices 602, 604, and 606.

Non-Transitory Computer Readable Storage Medium

In some embodiments, the platforms, systems, media, and methods disclosed herein include one or more non-transitory computer readable storage media encoded with a program including instructions executable by the operating system of an optionally networked computer. In further embodiments, a computer readable storage medium is a tangible component of a computer. In still further embodiments, a computer readable storage medium is optionally removable from a computer. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the computer's CPU, written to perform a specified task. Computer readable instructions may be implemented as program modules, such as functions, objects, API, data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Machine Learning

In some embodiments, machine learning algorithms are employed to build a model to determine quantifiable measures of dyadic ties between the individuals. In some embodiments, machine learning algorithms are employed to build a model to determine the filter relevant or chorological contact information for a user. Examples of machine learning algorithms may include a support vector machine (SVM), a naive Bayes classification, a random forest, a neural network, deep learning, or other supervised learning algorithm or unsupervised learning algorithm for classification and regression. The machine learning algorithms may be trained using one or more training datasets. For example, previously received contextual data may be employed to train various algorithms. Moreover, as described above, these algorithms can be continuously trained/retrained using real-time user data as it is received. In some embodiments, the machine learning algorithm employs regression modelling where relationships between variables are determined and weighted. In some embodiments, the machine learning algorithm employ regression modelling, wherein relationships between predictor variables and dependent variables are determined and weighted.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and eXtensible Markup Language (XML) database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or XML. In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile computer. In some embodiments, the mobile application is provided to a mobile computer at the time it is manufactured. In other embodiments, the mobile application is provided to a mobile computer via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Data Stores

In some embodiments, the platforms, systems, media, and methods disclosed herein include one or more data stores. In view of the disclosure provided herein, those of skill in the art will recognize that data stores are repositories for persistently storing and managing collections of data. Types of data stores repositories include, for example, databases and simpler store types, or use of the same. Simpler store types include files, emails, and so forth. In some embodiments, a database is a series of bytes that is managed by a DBMS. Many databases are suitable for receiving various types of data, such as weather, maritime, environmental, civil, governmental, or military data. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In some embodiments, a database is web-based. In some embodiments, a database is cloud computing-based. In some embodiments, a database is based on one or more local computer storage devices.

While preferred embodiments of the present disclosure have been shown and described herein, it will be obvious to those skilled in the art that such embodiments are provided by way of example only. Numerous variations, changes, and substitutions will now occur to those skilled in the art without departing from the described system. It should be understood that various alternatives to the embodiments described herein may be employed in practicing the described system.

EXAMPLES

Example 1

The Candidate

Steven has been interviewing a candidate named John for a senior vice president (SVP) job running a national sales team at his company. The process has been months long and involved many people, personality testing, internal discussions and reference calls. The final decision has come down to Steven. He is 99 percent ready to move forward, but has a lingering concern that John may not be the right fit for the job. He wants to find a person outside of his company that both he and John know to help him make the final decision. He looks on LinkedIn and sees that they have 58 shared connections. The lack of a relationship score hinders his ability to find the right individual to help him. However, by using the described dyadic ties measurement system Steven is able to quickly locate Sally who the system has determined has a high dyadic tie with both John and Steven. Steven reaches out to Sally who indeed does have firsthand knowledge working with John. Steven is able to have a very candid conversation with her and ask some very pointed questions about John's leadership style under pressure. Unfortunately, Sally confirms a lingering fear that Steven had about John's personality. Steven thanks Sally for her time, hangs up the phone and call John to let him know that they will not be making him an offer.

Example 2

The Request for Proposal (RFP)

Mike is the head of sales for company ABC Inc. that is a Workday implementer. ABC recently received a request for proposal (RFP) from national food service chain, XYZ Inc., to put Workday in every location in North America. This deal would make Mike's year, but it could also burn up half of his yearly business development budget. Currently nobody at ABC knows anyone at XYZ. What Mike really needs is a connection into XYZ corporate who can answer some basic question about the RFP. He is not looking to break any rules or laws; he just wants a "friend" to get some candid answers before he put 50% of his budget at risk. By using the described dyadic ties measurement system, Mike is able to determine that he has a mutual friend who knows a VP at XYZ.

Example 3

Hiring

A local law firm is looking expand and replace a couple of paralegals. In any business, one of the hardest things to do is to find "good help". The law firm is looking to maximize their time and search only for top talent and they want to leverage their current employees to find these new paralegals. Unfortunately, there is no tool that will tell them "who knows who". However, by using dyadic ties determined by the described dyadic ties measurement system, the firm can quickly return a shortlist of paralegals that are quantifiably connected to current employees. This list can quickly be reviewed and shortened even further through face-to-face conversations. Based on the conversations, it is determined that John and Alice, who are at other firms in town, are far and away some of the best at their jobs. The decision is made to go 25 percent over market to hire them away from their current firms.

Example 4

Private Equity

One of the most important things in business is not what you know but who you know. This is extremely important in the world of private equity. Eliot runs a private equity firm, Acumen Equity with over a billion dollars invested in various companies. Every company has challenges and opportunities that arise from time to time. Eliot employs the described dyadic ties measurement system to create a team where members can share connections among the investors, Acumen Equity, and the leadership team of the companies that have been purchased by Acumen. For example, company A may be trying to do business with company B. Company A is owned by Acumen. Company B's chief executive officer (CEO) is a 30 year business partner with one of the key investors at Acumen. Using described dyadic ties measurement system, they are easily able to find this connection that would otherwise be hidden from them.

What is claimed is:

1. A computer-implemented method for determining quantifiable measures of dyadic ties, the method being executed by one or more processors and comprising:
    receiving contextual data for a user from at least one data source;
    receiving validation data for the user from at least one data enricher;
    processing the contextual data and the validation data through a first machine-learning model to determine contact information for the user and a plurality of individuals, the first machine-learning model trained with previously received validation data and previously received contextual data of a plurality of other users;
    processing the contextual data, the validation data, and the determined contact information through a second machine-learning model to determine quantifiable measures of dyadic ties between the user and each of the plurality of individuals, the second machine-learning model trained with the previously received contextual data of the plurality of other users;
    determining a grouping for the user based on the determined quantifiable measures, the grouping comprising at least one individual from the plurality of individuals; and
    providing, through a user-interface, access to the determined quantifiable measures to members of the grouping.

2. The method of claim 1, wherein the second machine-learning model is retrained with the determined quantifiable measures.

3. The method of claim 1, wherein the quantifiable measures of dyadic ties are determined based on user contact detail quality, a frequency of communication, information within communications, information capacity and bandwidth, physical distance, social network ties, or timeliness of when contact information was updated.

4. The method of claim 1, wherein the second machine-learning model determines the quantifiable measures based on a compounding impact of individual elements from the contextual data.

5. The method of claim 1, wherein the second machine-learning model classifies relationships between the user and each of the individuals according to type, length, and age of the respective parties at a time when the respective relationship began, and wherein the second machine-learning model comprises weighted values for the classifications.

6. The method of claim 1, wherein the second machine-learning model merges the processed data to determine and verify current and previous contact information for the user and the individuals and to determine a chorological order of the contact information.

7. The method of claim 6, comprising:
    receiving, from the user-interface, corrections for the determined contact information, wherein the second machine-learning model is retrained with the corrections.

8. The method of claim 1, comprising:
    receiving, from the user-interface, instructions to remove the access to at least one of the determined measures.

9. The method of claim 1, wherein the contextual data is received from at least one source data provider via an application programming interface (API).

10. The method of claim 9, wherein the at least on source data provider comprises a social media provides, an email provider, the user's phone contacts, a messaging provider, a provider of at least one forum, a provider of an auction or selling site, or a provider of a recreational site.

11. The method of claim 1, wherein the contextual data is received on a periodic basis.

12. The method of claim 1, wherein the grouping includes the user.

13. The method of claim 1, comprising:
    providing, to the user-interface, an industry strength scoring for the user determined according to the determined quantifiable measures or a regional strength scoring for the user determined according to the determined quantifiable measures.

14. The method of claim 1, comprising:
    providing, to the user-interface, a best path to a decision maker determined according to the determined quantifiable measures.

15. The method of claim 1, comprising:
    providing, to the user-interface, a validation of a recruiting rolodex determined according to the determined quantifiable measures.

16. The method of claim 1, comprising:
providing the access to the determined quantifiable measures to a calendar application or an email client accessible by at least one of the members of the grouping or the user.

17. The method of claim 1, wherein the contextual data comprises digital footprint data for the user and digital path data for the user.

18. A dyadic ties measurement system, comprising:
a user-interface;
one or more processors; and
a computer-readable storage device coupled to the one or more processors and having instructions stored thereon which, when executed by the one or more processors, cause the one or more processors to perform operations comprising:
receiving contextual data for a user from at least one data source;
receiving validation data for the user from at least one data enricher;
processing the contextual data and the validation data through a first machine-learning model to determine contact information for the user and a plurality of individuals, the first machine-learning model trained with previously received validation data and previously received contextual data of a plurality of other users;
processing the contextual data, the validation data, and the determined contact information through a second machine-learning model to determine quantifiable measures of dyadic ties between the user and each of the plurality of individuals, the second machine-learning model trained with the previously received contextual data of the plurality of other users;
determining a grouping for the user based on the determined quantifiable measures, the grouping comprising at least one individual from the plurality of individuals; and
providing, through a user-interface, access to the determined quantifiable measures to members of the grouping.

19. One or more non-transitory computer-readable storage media coupled to one or more processors and having instructions stored thereon which, when executed by the one or more processors, cause the one or more processors to perform operations comprising:
receiving contextual data for a user from at least one data source;
receiving validation data for the user from at least one data enricher;
processing the contextual data and the validation data through a first machine-learning model to determine contact information for the user and a plurality of individuals, the first machine-learninq model trained with previously received validation data and previously received contextual data of a plurality of other users;
processing the contextual data, the validation data, and the determined contact information through a second machine-learning model to determine quantifiable measures of dyadic ties between the user and each of the plurality of individuals, the second machine-learning model trained with the previously received contextual data of the plurality of other users;
determining a grouping for the user based on the determined quantifiable measures, the grouping comprising at least one individual from the plurality of individuals; and
providing, through a user-interface, access to the determined quantifiable measures to members of the grouping.

* * * * *